H. A. SHAPIRO.
SPROCKET WHEEL FLANGE.
APPLICATION FILED FEB. 7, 1913.
1,181,175.
Patented May 2, 1916.
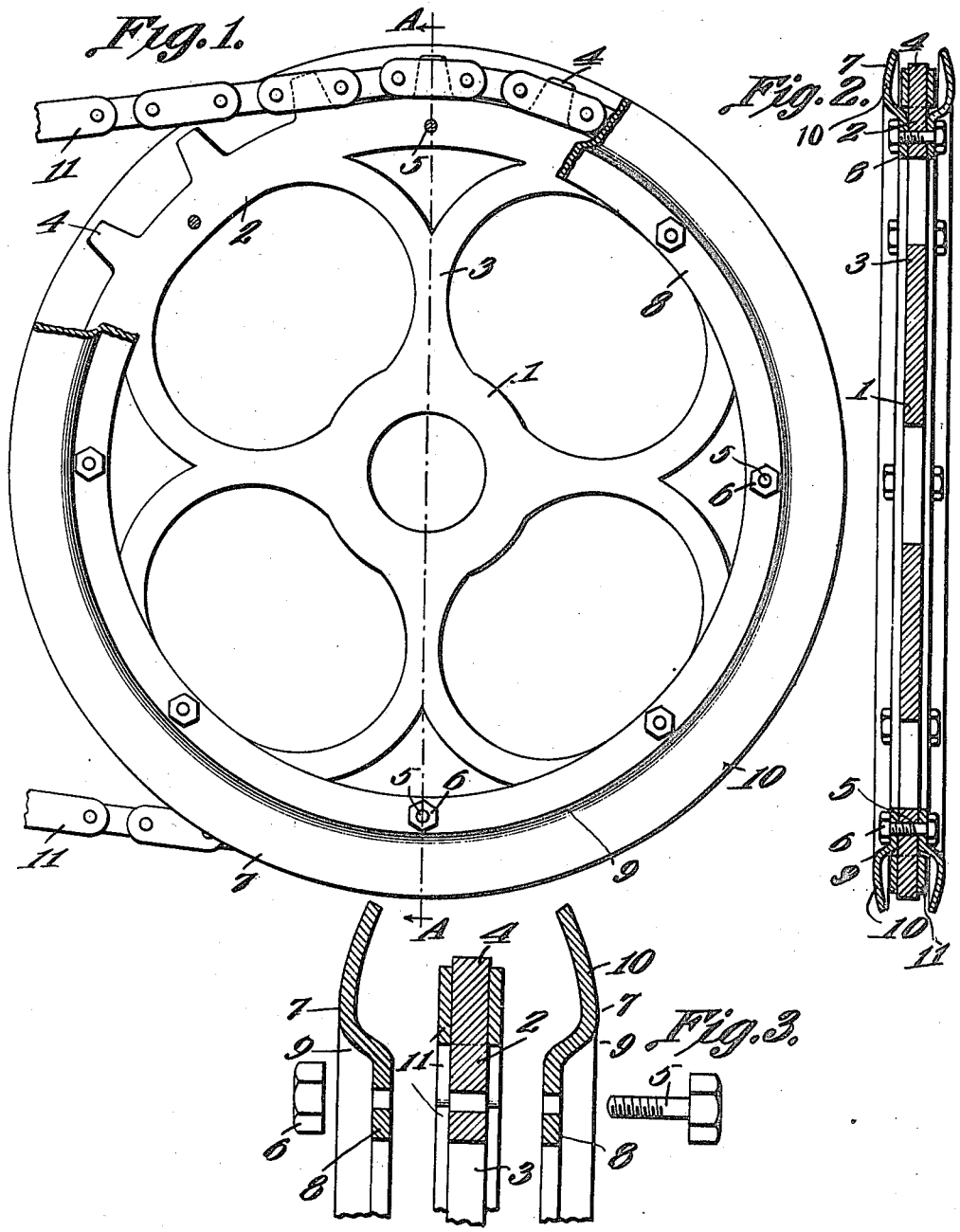

UNITED STATES PATENT OFFICE.

HYMAN A. SHAPIRO, OF DENVER, COLORADO.

SPROCKET-WHEEL FLANGE.

1,181,175.  Specification of Letters Patent.  Patented May 2, 1916.

Application filed February 7, 1913. Serial No. 746,880.

*To all whom it may concern:*

Be it known that I, HYMAN A. SHAPIRO, a citizen of the United States, residing at Denver, in the county of Denver and State of Colorado, have invented a new and useful Sprocket-Wheel Flange, of which the following is a specification.

This invention relates to flanges adapted to be used with sprocket wheels of the usual type.

The invention relates more particularly to flanges which may be applied to sprocket wheels already in use.

An object of the present invention is to provide a sprocket wheel flange which may be readily attached to any sprocket wheel and serve as a guide for the chains when so applied.

A further object is to provide sprocket wheel flanges which will prevent and eliminate all chances of the chains from riding over and coming off the sprocket wheels.

A further object is to provide a protecting flange for the chain and to prevent the chain from riding up upon the sprocket wheel and breaking.

A further object is to provide the said flanges of simple and efficient construction and which render little or no structural change necessary to the sprocket wheel to which they are designed to be attached.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings forming a part of this specification, the preferable form of my invention has been illustrated, in which:—

Figure 1 is a view in elevation of a sprocket wheel with my improved flanges attached thereto, a portion of which flanges have been removed in order to more clearly illustrate the sprocket wheel included therebetween. Fig. 2 is a cross sectional view taken on the line A—A of Fig. 1. Fig. 3 is a fragmental enlarged view showing the manner in which the flanges are assembled prior to the securing thereof to the sprocket wheel.

Referring to the drawings in which similar reference numerals designate corresponding parts throughout the several views, 1 is a sprocket wheel hub connected to the rim 2 thereof by means of the arms or webbing 3. The sprocket wheel is provided with the usual projections or teeth 4 all of which construction is of the ordinary type such as is used in connection with bicycles, motor vehicles, and similar devices employing chain gearing.

My improved flanges which are adapted to fit upon the opposite sides of the rim 2 of the sprocket wheel are in the form of annular flanges, the outer periphery of which is adapted to extend a slight distance beyond the outer extremities of the sprocket wheel teeth. The inner periphery of said flanges approximate the inner periphery of the rim 2 as more clearly illustrated in Fig. 1 of the drawing. The sprocket wheel rim and the annular flanges are provided with a plurality of alined or registering openings through which extends the securing means illustrated in the present drawings as consisting of the bolts 5 and the securing nuts 6 therefor.

The transverse sectional contour of the annular flanges 7 is more clearly illustrated in Fig. 3 and may be described as having an inner flat portion 8 which is adapted to be secured in contact with the rim 2 of the sprocket wheel. The upper or outer portions of these annular flanges are bent sharply outwardly as at 9 for a short distance and then continue at a slight angle to the plane of the portion 8 as at 10. Fig. 2 illustrates the manner in which the sprocket wheel teeth are embraced by the outer portions of these flanges and also illustrates the manner in which the chain 11 is guided therebetween.

The advantages accruing from the particular type of flange used is that said flanges may be positioned upon and attached to any sprocket wheel already in use without necessitating any material changes. Furthermore by the bending outwardly of the outer portion of the flanges as at 10, suitable provision is made for the clearance of the chain therebetween and furthermore the advantages of a flat continuous surface are obtained and the heads and nuts for the bolts 5 will be effectually hidden or protected, the same being more clearly shown in Fig. 2. Furthermore the design of the flanges provides for a certain inherent strength which is not gained by a plain flat surface. The advantages of a chain guide and flanges as illustrated are that the chain 11 is prevented from riding up upon the sprocket teeth 4 and that suitable protection is afforded, the flanges in this instance serving as a casing. Furthermore, the special advantage gained by having the flanges detachable allows them to be readily removed and the space between the two flanges and the sprocket wheel teeth to be readily accessible for the purpose of cleaning or inspection.

Having thus fully described my invention what I claim to be new and original with me is:—

In a device of the class described, a sprocket wheel; a chain engaging the sprocket wheel; and flanges having flat inner portions secured to the sides of the wheel, the outer portions of the flanges being bent sharply outward and then continued inward at a slight angle to the flat inner portions, and being disposed in converging relation, thereby to coöperate with the sides of the chain as the chain coacts with the periphery of the wheel, and to prevent the chain from riding up onto the teeth of the wheel.

In testimony that I claim the foregoing as my own, I have hereto affixed my signature in the presence of two witnesses.

HYMAN A. SHAPIRO.

Witnesses:
　EMIL OCKEL,
　CARL MORITZ.